J. M. DALY.
APPARATUS FOR STORING AND TRANSPORTING VEHICLES.
APPLICATION FILED MAR. 14, 1916.
1,282,766.
Patented Oct. 29, 1918.
4 SHEETS—SHEET 1.
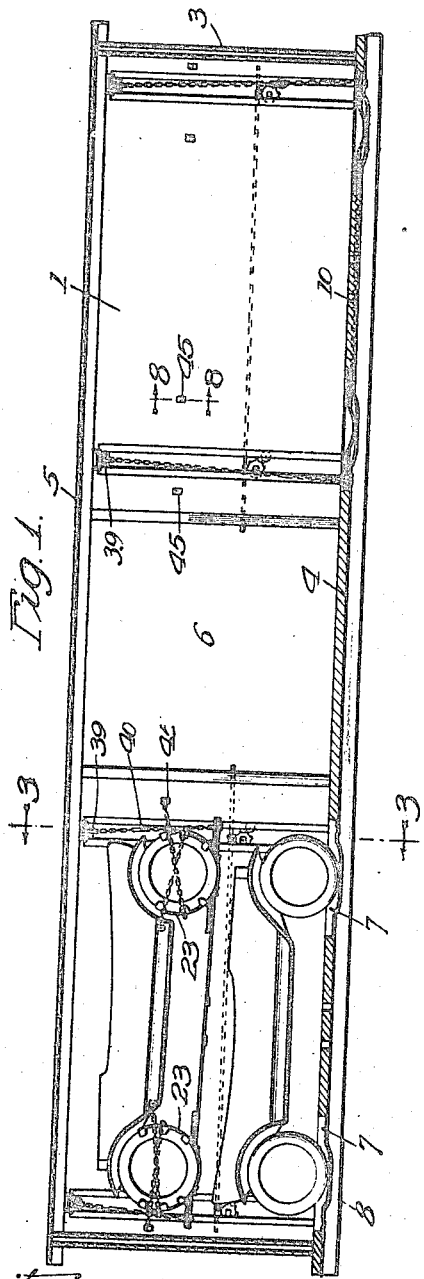
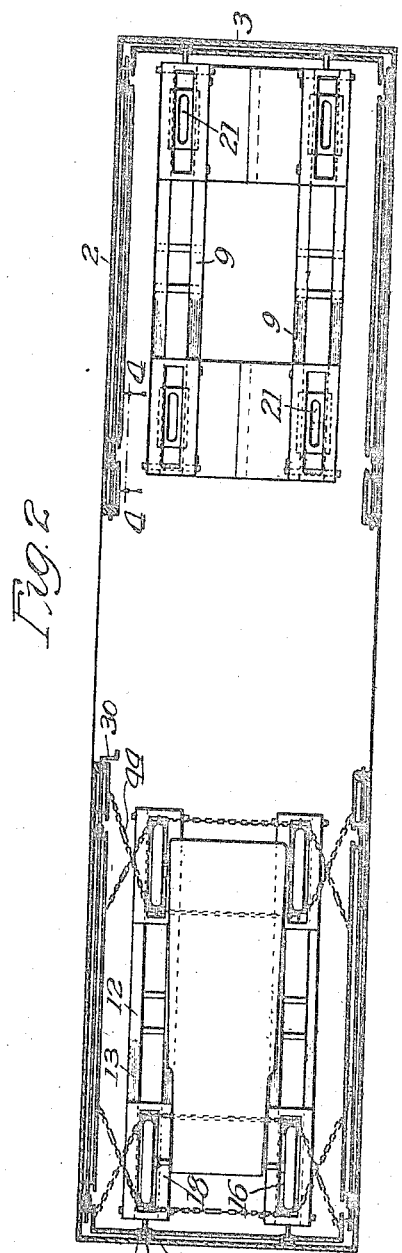

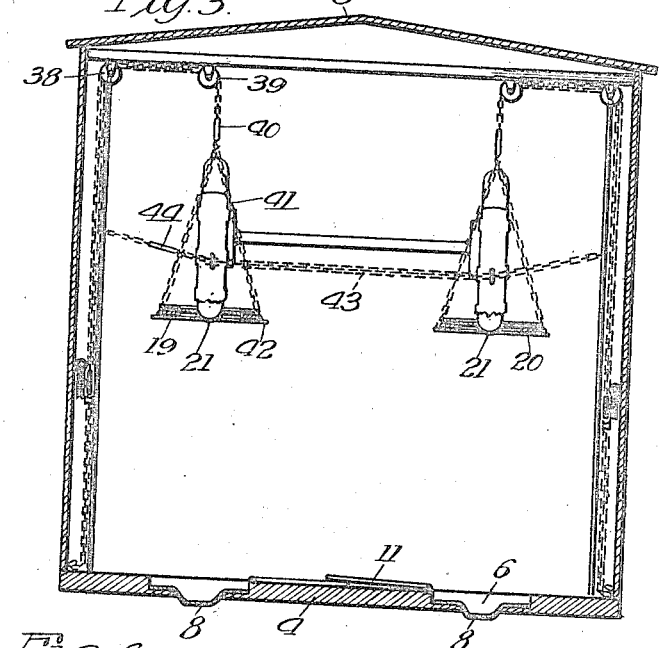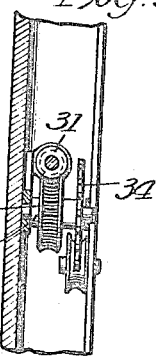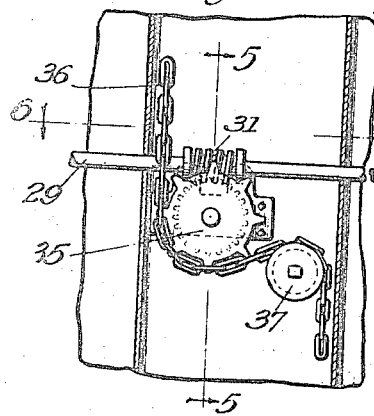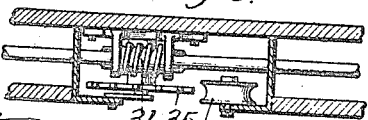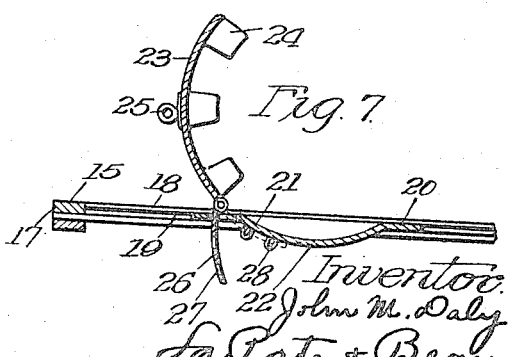

J. M. DALY.
APPARATUS FOR STORING AND TRANSPORTING VEHICLES.
APPLICATION FILED MAR. 14, 1916.

1,282,766.
Patented Oct. 29, 1918.
4 SHEETS—SHEET 3.

J. M. DALY.
APPARATUS FOR STORING AND TRANSPORTING VEHICLES.
APPLICATION FILED MAR. 14, 1916.
1,282,766.
Patented Oct. 29, 1918.
4 SHEETS—SHEET 4.
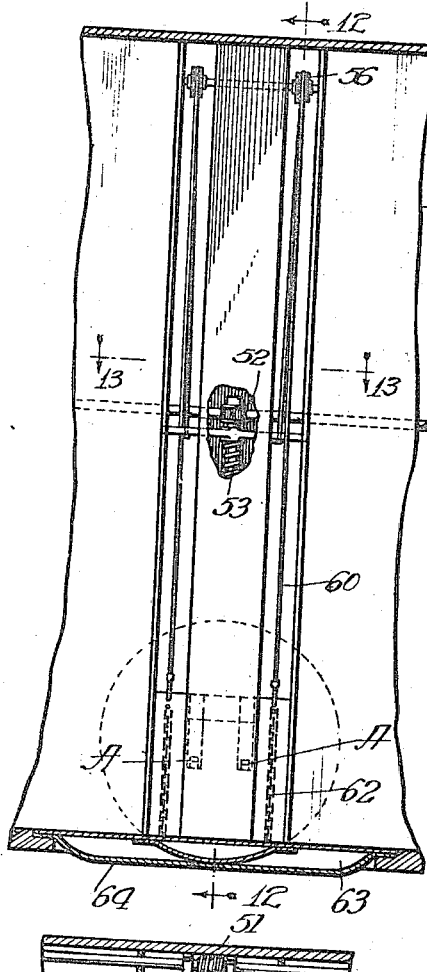
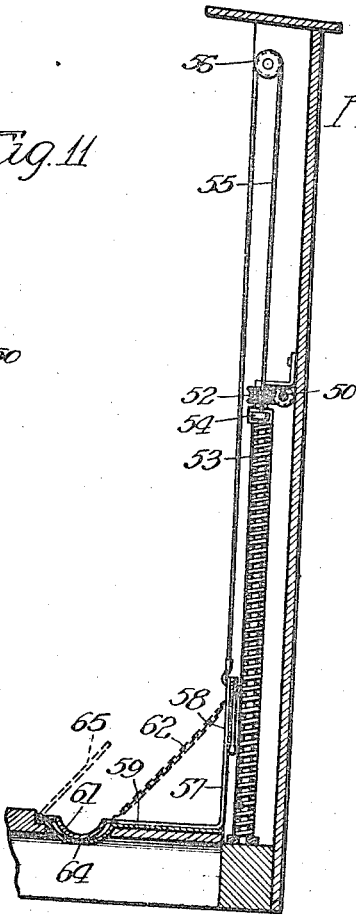
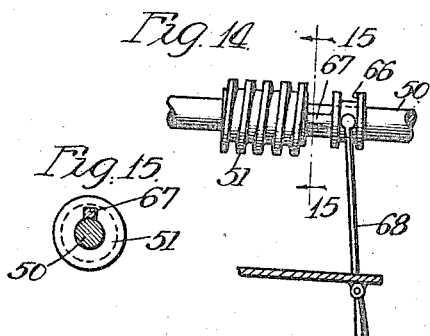

UNITED STATES PATENT OFFICE.

JOHN M. DALY, OF CHICAGO, ILLINOIS.

APPARATUS FOR STORING AND TRANSPORTING VEHICLES.

1,282,766.  Specification of Letters Patent.  Patented Oct. 29, 1918.

Application filed March 14, 1916. Serial No. 84,043.

*To all whom it may concern:*

Be it known that I, JOHN M. DALY, a citizen of the United States, a resident of Chicago, in the county of Cook and State of Illinois, have invented new and useful Improvements in Apparatus for Storing and Transporting Vehicles, of which the following is a specification.

This invention relates to improvements in apparatus for storing and transporting vehicles and has for one of its objects the provision of appliances adapted to be installed in a freight car for the economical loading and transportation of vehicles, particularly motor vehicles, therein, being directed to the same art as disclosed and claimed in my copending applications filed February 9th, 1916, and bearing Serial Numbers 77,308; 77,309; 77,310 and 77,311.

A further object of this invention is the provision of a freight car having means installed therein for lifting vehicles, so that a plurality of vehicles may be stacked within the car and securely supported in position so as to obviate any possibility of damage and injury due to movement within the car during transportation, whereby the effective capacity of the car is increased.

A further object is the provision of a freight car having a means provided therein for readily stacking a plurality of vehicles so as to increase the effective capacity thereof, said means being installed within the walls and below the floor so that when not in use, the car may be used for general merchandise or for the transportation of grain or other uses.

To the accomplishment of the foregoing and such other objects as may hereinafter appear, my invention consists in the construction, combination and arrangement of parts hereinafter described and then sought to be defined in the appended claims, reference being had to the accompanying drawings which show two forms of my invention for the purpose of disclosure, it being understood, however, that various changes may be made in practice within the scope of the claims without digressing from my inventive idea.

In the drawings,

Figure 1 represents a vertical longitudinal section of a freight car equipped with the preferred form of appliances embodying my invention;

Fig. 2 is a longitudinal horizontal section of Fig. 1;

Fig. 3 is a vertical transverse section taken on line 3—3 of Fig. 1;

Fig. 4 is a detail side elevation looking from line 4—4 of Fig. 2;

Fig. 5 is a vertical section taken on line 5—5 of Fig. 4;

Fig. 6 is a sectional view taken on line 6—6 of Fig. 4, showing the windlass mechanism in top plan;

Fig. 7 is a detail view of the shoe for engaging the tire of the vehicle;

Fig. 8 is a detail view of the securing means for the transverse braces taken on line 8—8 of Fig. 1;

Fig. 11 is a view taken from line 11—11 of Fig. 10 showing the floor and associated elements in section and the sides and associated mechanism in elevation, parts being broken away and other parts indicated in dotted lines to facilitate the disclosure;

Fig. 12 is a vertical section taken substantially on line 12—12 of Fig. 11;

Fig. 13 is a horizontal section taken on line 13—13 of Fig. 11 showing the windlass mechanism in top plan;

Fig. 14 is a side elevation of a portion of the operating shaft and one of the worms, showing the clutch mechanism, whereby the vehicle may have one portion raised higher than the other;

Fig. 15 is a vertical section on line 15—15 of Fig. 14.

Throughout the drawings, like characters of reference are used to designate the same parts throughout the figures.

Figure 9:
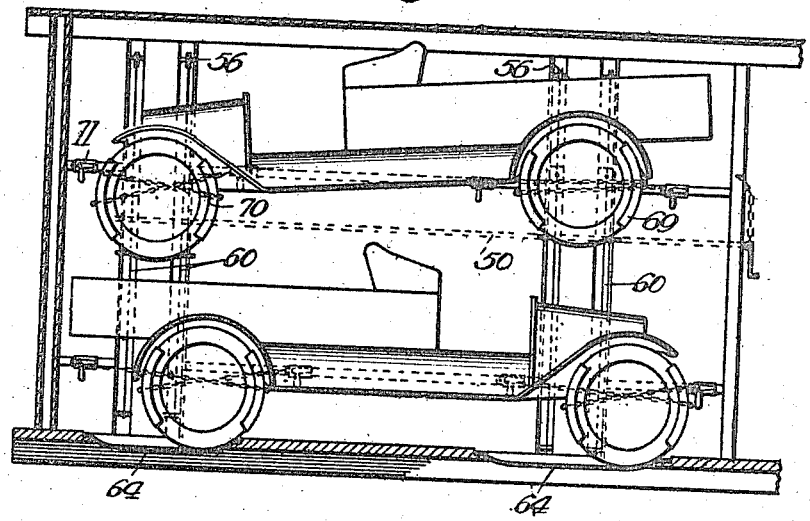
Fig. 9 is a vertical longitudinal section of one portion of a car equipped with another form of appliances embodying my invention, one vehicle being shown stacked above another and positioned at an incline.

A preferred form of my invention is disclosed in Figs. 1 to 8 inclusive of the drawing, which will be described first. The numeral 1 designates a freight car which is of the usual construction, having the double walled sides 2 and ends 3, and also having the floor 4, roof 5 and door-way 6, as is well understood.

This form of my invention includes a lifting frame on which the vehicle is supported, which frame when not in use is positioned within the floor portion of the car. The lifting means for the frame is positioned between the walls of the sides 2, so that all of the appliances are out of the way so that the car may be used for general freight and grain transportation.

The floor 4 of the car is formed so as to receive the lifting frame and has the enlarged cut out portions 7 which are preferably arranged in pairs to correspond to the wheels of the vehicles to be transported, these cut-out portions being provided with the bottom member 8 which is depressed substantially as shown in Fig. 1 and Fig. 3 so as to receive the end members of the lifting frame and also the wheels of the vehicle. These cut out portions 6 are connected by the longitudinal slot portions 9 arranged in pairs as shown to receive the longitudinal members of the lifting frame and having the transverse slots 10 connecting the slots 9 and adapted to receive transverse members of the lifting frame. The cut out portions 6 are provided with the doors or covers 11 for covering them when the lifting frame is not in use.

The lifting frame itself is designated by the reference character 12 and as shown, one lifting frame is provided for each side of the vehicle. Each lifting frame includes the longitudinal members 13 arranged in pairs and corresponding to the longitudinal slot portions 9 in the floor of the car, and also having the transverse brace members 14 connecting them which are arranged to correspond to the transverse slots 10 in the floor of the car. At each end of the lifting frame I provide a supplemental frame 15 which is rectangular in shape, having the enlarged opening 16 therein, its end members 17 fitting against the longitudinal members 13 of the lifting frame, its side members 18 being substantially L-shaped in cross-section as best shown in Figs. 3 and 7, so as to provide the space or guide-way 19 between the longitudinal members 13 and the side members 18. This space or guide-way 19 receives the side portions or flanges 20 of the socket member 21 which has its intermediate portion depressed as at 22 to correspond to the shape of the vehicle wheel, being adapted to receive the same. The socket members 21 are slidably mounted in these guideways 19 so that they may be moved to accommodate vehicles of different sizes and of different length wheel base, that is, they may be moved longitudinally or transversely of the lifting frame, as is obvious from a consideration of Figs. 3 and 7, particularly.

In connection with the socket member 21, I utilize the supporting shoes 23 which are curved as shown, having the finger portions 24 to embrace the sides of the wheel or tire of the vehicle and being provided with the eye 25 to receive the bracing member, to be hereinafter described. Each supporting shoe is provided with the pivoted flap member 26 which has the openings 27 therein to receive the eyes or staples 28 provided on the depressed portion 22 of the socket member 21 so that when the supporting shoe is secured to the socket member, the curved supporting means is substantially continuous.

As stated hereinbefore, the means for raising the lifting frames is positioned between the double walls forming the sides of the car so as to be out of the way and include a windlass member, a preferred form of which is shown particularly, in Figs. 4, 5 and 6. This windlass mechanism includes the operating shaft 29 which extends longitudinally of the car and may be operated manually as by means of crank 30 or by means of any suitable motor, it being understood that the shaft may be secured against theft or unauthorized removal by the means shown. Secured to the shaft is the worm 31 which meshes with the worm wheel 32 on shaft 33 which is journaled between the two walls of the sides of the car and which has the sprocket wheel 34 secured thereto to rotate therewith. The teeth of this sprocket wheel are adapted to engage the links 35 of the chain 36, the idler roller or wheel 37 being provided to cause the chain to engage the sprocket for a sufficient portion of its periphery to insure positive action.

This chain extends upwardly and over pulleys 38 and 39, the latter being positioned within the car and over the lifting frame. The end of the chain is provided with a hook and turn buckle member 40 engaging the flexible connectors 41 which are preferably arranged in pairs and extend downwardly, being connected to the extending ends 42 of an end member of the lifting frame. It is to be noted that the connection is made on the outside ends of the lifting frame so as to throw the weight nearer the center of gravity and to reduce the tendency of the frame to slide out from under the car.

In order to brace the vehicle and hold the same securely on the lifting frame, I provide the transversely extending brace members 43, which are shown in the form of chains having the turn buckle member 44 for adjustment and the ends of which are secured to the side walls of the car to the eyes 45. It is to be understood that while I have described and shown the securing means 45 in a permanent position, that I may utilize adjustable securing and locking means for this purpose such as described in my aforementioned pending applications.

It is to be noted that as shown in Fig. 1, one end of the upper car is raised higher than the other so as to permit stacking, that is, the positioning of another car thereunder. This is accomplished by means of the turn buckle arrangement and may also be accomplished by operating the windlass mechanisms separately.

It is to be noted that I provide in connection with the ends of the lifting frame, a guiding and holding member 46 having a T-shaped head 47 fitted in a correspondingly shaped guide-way 48 in the end of the car. This arrangement securely holds the lifting frames against tilting or turning in any direction, it being understood that the neck of the member 46 is of sufficient length for this purpose.

When the car is not in use for the transportation of vehicles the lifting frames will all be in position within the floor portion of the car with the tops or covers 11 shut so that the car may be used for any desired purpose. When it is desired to transport vehicles, the first vehicle is positioned on the moving frame and braced thereon by means of the construction and arrangement shown and described. The lifting frames are then raised so as to elevate the vehicle and a second vehicle may be placed thereunder, the wheels fitting in the bottom members 8. These lower vehicles may be braced against movement in any suitable manner, such as described in my aforesaid pending applications.

Figure 10:
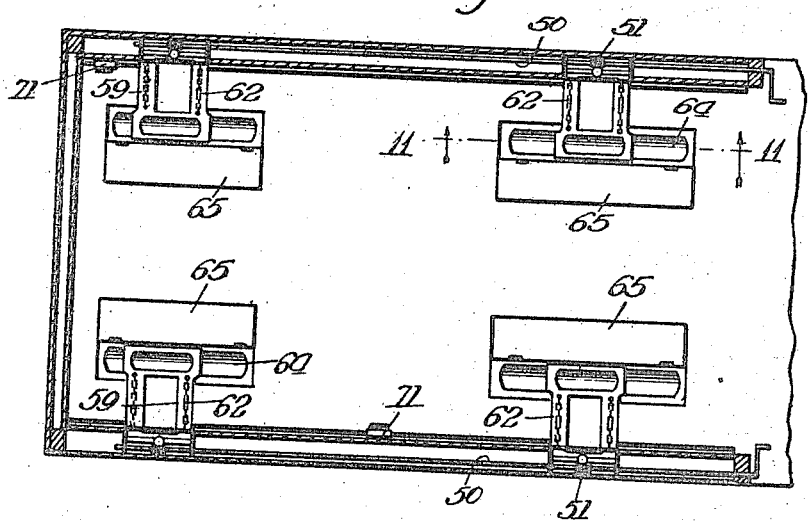
Fig. 10 is a longitudinal horizontal section of the car shown in Fig. 9, showing the floor plan.

Another form of this invention is illustrated in Figs. 9 to 15, inclusive, to which reference will now be made. I utilize the longitudinal shaft 50 which is mounted between the spaced walls of the sides of the car, having the worm 51 which engages with the worm wheel 52 which is secured on the end of the screw shaft 53 which extends vertically and is journaled within the spaced walls of the sides of the car.

The follower member 54 is adapted to be moved up and down by the rotation of the screw shaft 53 and has the flexible connections 55 secured thereto, which extend over pulleys 56 and down to the lifting and supporting member 57, which is positioned within the walls of the sides of the car and which comprises the pair of vertical members 58 and the pair of horizontal members 59 which operate in the slots 60 formed in the inner wall of the sides of the car. The lifting and supporting member 57 has the anti-friction rollers 60' engaging the inside face of the inner wall, as shown, to facilitate this operation.

To the ends of the horizontal members 59, is secured the socket member 61 which is depressed to approximate the shape of the vehicle wheel or tire, being adapted to receive the same. The diagonally extending chains 62 are provided to brace the lifting and supporting member. When not in use for transporting vehicles, the socket member is positioned within the cut out portion 63 in the floor of the car, which has the bottom member 64 and the hinge top or cover 65.

The operation of this mechanism is readily understood in view of the description of the preferred form and from a consideration of the drawings. The first car is positioned on the lifting and supporting members 57 and the shaft 50 is operated by power or by hand to rotate the shafts 53. This causes the lifting of the members 57 and the vehicle which is placed thereon. If it is desired to raise one end of the vehicle higher than the other, to facilitate stacking the cars, or for any other purpose, I provide means whereby the operative connection to the source of power may be made or broken at will, this taking the form of the clutch mechanism shown in Figs. 14 and 15. The worm 51 is loosely mounted on the shaft 50 and the sleeve 66 has the key 67 for operatively connecting the worm to the shaft, the sleeve being operated by the usual lever.

In this connection I use the shoes 69 which engage the wheels or tires of the vehicle and which have the flexible connections 70 with the locking means 71, this locking means being adjustable so that it may be secured in various adjusted positions. It is described in detail in my aforesaid pending applications.

It is to be noted that in the preferred form of my invention, the connections for lifting the vehicle within the car, are directly over the same, so that all of the power is applied for the purpose of lifting. This forms a particularly advantageous feature of this mechanism. During the lifting the frame is securely held against tilting or turning and against shifting and the vehicle is securely held and braced thereon.

What I claim is:—

1. In combination in a car, a plurality of supporting means adapted to receive a vehicle and hold the same for storing and transportation, lifting means and direct connections extending from said lifting means to the roof of the car and downwardly to said supporting means, whereby when said lifting means is actuated, the vehicle will be raised within the car.

2. In combination in a car, a plurality of supporting means adapted to receive a vehicle and hold the same for storing and transportation, lifting means and connections extending from said lifting means upwardly and then downwardly to said supporting means, whereby when said lifting means is actuated, the vehicle will be raised within the car, and means for bracing and holding the vehicle on said supporting means.

3. In combination in a car, a plurality of supporting means adapted to receive a vehicle and hold the same for storing and transportation, lifting means and connections extending from said lifting means upwardly and then downwardly to said supporting means, whereby when said lifting means is actuated, the vehicle will be raised within the car, and means for bracing and holding the vehicle on said supporting means, including flexible connections secured to the sides of the car and to said supporting means.

4. In combination in a car, a plurality of supporting means adapted to receive a vehicle and hold the same for storing and transportation, said supporting means being positioned within the floor portion of the car when not in use, lifting means located within the side walls of the car and having overhead connections with said supporting means, whereby when the lifting means is actuated, the vehicle will be raised within the car.

5. In combination in a car, a plurality of supporting means adapted to receive a vehicle and hold the same for storing and transportation, said supporting means being positioned within the floor portion of the car when not in use, lifting means located within the side walls of the car and having overhead connections with said supporting means, whereby when the lifting means is actuated, the vehicle will be raised within the car, and flexible bracing means secured to the sides of the car and to said supporting means for bracing and holding the vehicle on said supporting means.

6. In combination in a car, a plurality of lifting frames on which the wheels of the vehicles are adapted to rest, said frames extending longitudinally of the car and each frame supporting one side of the vehicle, and means for raising and lowering said frames.

7. In combination in a car, a plurality of lifting frames on which the wheels of the vehicles are adapted to rest, said frames extending longitudinally of the car and each frame supporting one side of the vehicle, means for raising and lowering said frames, and bracing means secured to the sides of the car and extending transversely thereof and engaging said frames for bracing and holding the vehicle thereon.

8. In combination in a car, a plurality of lifting frames having members adjustably mounted therein to receive the wheels of vehicles of various sizes, and means for raising and lowering said frames within the car.

9. In combination in a car, a plurality of lifting frames having plate members with depressed portions, said plate members being slidable both longitudinally and transversely of the frames so as to receive wheels of vehicles of various sizes and means for raising and lowering said frames within the car.

10. In combination in a car, a plurality of lifting frames on which the wheels of the vehicles are adapted to rest, shoes removably attached to said frames and adapted to engage the wheels or tires of the vehicle, means for raising and lowering said frames within the car and bracing means secured to the sides of the car and said shoes for bracing the vehicle and holding the same on the frames.

11. In combination in a car, a plurality of lifting frames on which the wheels of the vehicles are adapted to rest, lifting means within the sides of the car and overhead connections from said lifting means to the lifting frames, whereby when the means is actuated the lifting frames will be raised and lowered within the car.

12. In combination in a car, a plurality of lifting frames on which the wheels of the vehicles are adapted to rest, lifting means within the sides of the car and overhead connections from said lifting means to the lifting frames, whereby when the means is actuated the lifting frames will be raised and lowered within the car, said lifting means including a shaft having a worm thereon, a worm wheel in engagement with said worm and operating a sprocket wheel and said connections including a chain adapted to engage the teeth of the sprocket wheel.

13. In combination in a car, a plurality of lifting frames on which the wheels of the vehicles are adapted to rest, the floor of the car being cut away to receive the lifting frames when not in use to support a vehicle, said lifting frames extending longitudinally of the car and being adapted to support one side of the car and means for raising and lowering said lifting frames.

14. In combination in a car, a plurality of lifting frames on which the wheels of the vehicles are adapted to rest, means for raising and lowering the lifting frames, said lifting frames having a slidable connection with the ends of the car for the purpose of guiding the same and preventing them from turning or tilting sidewise.

15. In combination in a car, a plurality of supporting means adapted to receive the wheels of a vehicle and means for lifting said supporting means positioned within the side walls of the car and including a longitudinal shaft, having a worm thereon, said worm meshing with a worm wheel, a vertical shaft on which said worm wheel is secured, said vertical shaft having screw threads, a follower member engaging said screw threads and flexible connections between said follower member and said supporting means.

16. In combination in a car, a plurality of supporting means adapted to receive the wheels of a vehicle and means for raising and lowering said supporting means, said supporting means including spaced vertical members and spaced horizontal members connected thereto with a socket member secured to said horizontal member, the bottom portion of the car being cut away to receive the socket member when the supporting means is in its lowermost position.

17. In combination in a car, having a floor, roof, and double walled sides spaced apart, a plurality of supporting means within the car adapted to receive a vehicle and to hold the same for storing and transportation, lifting means located within the double side walls of the car and having connections to said supporting means, whereby when said lifting means is actuated, the supporting means will be moved.

18. In combination in a car, having a floor, roof, and double walled sides spaced apart, a plurality of supporting means within the car adapted to receive a vehicle and to hold the same for storing and transportation, lifting means located within the double side walls of the car and having connections extending upwardly from said lifting means to the roof of the car and downwardly to said supporting means, whereby when said lifting means is actuated, the vehicle will be raised within the car.

19. In combination in a car, a lifting frame on which the wheels of a vehicle are adapted to rest, means for raising and lowering said lifting frame, the end of the car being provided with a guide-way and a T-shaped head member connected to the lifting frame and having a slidable connection with the guide-way for preventing the lifting frame from turning or tilting sidewise.

20. In combination in a car, a supporting means adapted to receive the wheel of a vehicle and means for raising and lowering said supporting means, said supporting means including spaced vertical members and spaced horizontal members connected thereto, and an additional member supported by said horizontal members for receiving the wheel of the vehicle.

21. In combination in a car, a supporting means adapted to receive the wheel of a vehicle and means for raising and lowering said supporting means, said supporting means including spaced vertical members and spaced horizontal members connected thereto, and an additional member supported by said horizontal members for receiving the wheel of the vehicle, the side walls of said car being cut away to provide slots in which said horizontal members travel.

22. In combination in a car having a floor, roof and double walled sides, a supporting means including spaced vertical members positioned between the double walls and spaced horizontal members extending through slots which are provided in the inner wall on the side, and means for raising and lowering said supporting means also positioned within the double walls forming the sides of the car.

JOHN M. DALY.